(12) United States Patent
Svenson

(10) Patent No.: US 7,159,914 B2
(45) Date of Patent: Jan. 9, 2007

(54) DECORATIVE COVERING FOR AN INTERIOR TRIM COMPONENT

(75) Inventor: Richard Svenson, Northville, MI (US)

(73) Assignee: Intier Automotive Inc., Newmarket (CA)

( * ) Notice: Subject to any disclaimer, the term of this patent is extended or adjusted under 35 U.S.C. 154(b) by 90 days.

(21) Appl. No.: 11/093,612

(22) Filed: Mar. 30, 2005

(65) Prior Publication Data
US 2005/0225113 A1    Oct. 13, 2005

(51) Int. Cl.
B60J 9/00    (2006.01)

(52) U.S. Cl. ............... 296/1.08; 296/146.7; 428/31

(58) Field of Classification Search ............... 296/1.08, 296/39.1, 146.7; 52/716.5; 428/31, 187, 428/204, 195.1, 192
See application file for complete search history.

(56) References Cited

U.S. PATENT DOCUMENTS

| | | | | |
|---|---|---|---|---|
| 4,126,727 A | * | 11/1978 | Kaminski | 428/172 |
| 4,158,073 A | * | 6/1979 | Schneider et al. | 427/195 |
| 4,599,264 A | * | 7/1986 | Kauffman et al. | 428/159 |
| 4,780,345 A | * | 10/1988 | Gray | 428/31 |
| 4,784,911 A | | 11/1988 | Gembinski et al. | |
| 4,829,644 A | * | 5/1989 | Kondo et al. | 29/91.1 |
| 4,923,657 A | | 5/1990 | Gembinski et al. | |
| 5,262,108 A | * | 11/1993 | Minke et al. | 264/163 |
| 5,297,842 A | * | 3/1994 | Hayashi | 296/146.7 |
| 5,304,273 A | * | 4/1994 | Kenrick et al. | 156/219 |
| 5,564,249 A | * | 10/1996 | Borys et al. | 52/716.5 |
| 5,571,597 A | * | 11/1996 | Gallagher et al. | 296/70 |
| 5,573,617 A | * | 11/1996 | Franck et al. | 156/196 |
| 5,705,005 A | | 1/1998 | Ash | |
| RE35,739 E | * | 2/1998 | Ellison et al. | 428/31 |
| 5,773,115 A | * | 6/1998 | Ash | 428/31 |
| 5,891,564 A | * | 4/1999 | Shultz et al. | 428/324 |
| 6,077,576 A | * | 6/2000 | Osborn | 296/209 |
| 6,103,328 A | * | 8/2000 | Niazy | 428/40.1 |
| 6,110,547 A | | 8/2000 | Sano et al. | |
| 6,402,874 B1 | * | 6/2002 | Kelly | 156/245 |
| 6,481,775 B1 | | 11/2002 | Brocklehurst | |
| 2002/0070583 A1 | | 6/2002 | Brocklehurst | |
| 2003/0170460 A1 | * | 9/2003 | Sienkiewicz et al. | 428/411.1 |
| 2004/0106345 A1 | | 6/2004 | Zafiroglu | |
| 2004/0106346 A1 | * | 6/2004 | Zafiroglu | 442/149 |

FOREIGN PATENT DOCUMENTS

| | | |
|---|---|---|
| EP | 0176274 | 4/1986 |
| EP | 0904194 | 3/2003 |
| WO | WO-97/40980 | 11/1997 |
| WO | WO-2004/050347 | 6/2004 |

* cited by examiner

Primary Examiner—Kiran B. Patel
(74) Attorney, Agent, or Firm—Honigman Miller Schwartz and Cohn LLP

(57) ABSTRACT

A decorative covering for an internal trim component for a vehicle comprises an outer surface that includes a gradient characteristic when referenced to an adjacent trim component. The gradient characteristic may comprise a plurality of texture gradient zones and/or a plurality of color gradients. A method of manufacturing the decorative covering and the internal trim component with the decorative covering is also disclosed.

11 Claims, 5 Drawing Sheets

DECORATIVE COVERING FOR AN INTERIOR TRIM COMPONENT

BACKGROUND OF THE INVENTION

1. Field of the Invention

The present invention relates to a decorative covering, and in particular, to a decorative covering for an interior trim component having an outer surface gradient characteristic that includes one of color and/or texture.

2. Description of the Related Art

Referring now to FIG. 4, a conventional passenger compartment 100 of a vehicle, V, includes one or more interior trim components, such as a headliner 101, a door bolster 102, a door panel 103, a handle bezel 104, an instrument panel 105, and pillars 106a–106c. The pillar 106a, commonly known as an "A-pillar", extends between the headliner 101 and the instrument panel 105. The pillar 106b, commonly known as a "B-pillar", is defined by upper portion 107 and a lower portion 108 that are both located over a vehicle body structure (not shown), typically made of sheet metal, or the like. Similarly, the pillar 106c is commonly known as a "C-pillar".

Typically, the pillars 106a–c, for example, are covered with a trim component made of a plastic material, and then the trim component is usually covered with a decorative covering. Although adequate for covering the interior trim component, the conventional decorative covering typically is made of a material that is different in texture and/or color than the headliner 101, the instrument panel 105 and/or the lower portion 108, thereby causing an abrupt change in either the texture or color. This abrupt change is most noticeable at seam 109 between the headliner 101 and the upper portion 107, and at seam 110 between the headliner 101 and the lower portion 108 or the instrument panel 105. Unfortunately, this abrupt change in either texture and/or color causes an undesirable appearance in the passenger compartment 100 of the vehicle, V.

Thus, there is a need to provide a decorative covering for an interior trim component that provides a more aesthetically pleasing appearance in the passenger compartment of a vehicle. The decorative covering of the invention may be included in any vehicle, but is of particular importance to luxury vehicles in which customers demand a higher expectation for the passenger compartment to be aesthetically pleasing in appearance.

SUMMARY OF THE INVENTION

The inventors of the present invention have recognized these and other problems associated with vehicular trim components. To this end, the inventor has developed a decorative covering for an interior trim component comprising an outer surface including a gradient characteristic comprising one of color and texture when referenced from one of an outer surface color and an outer surface texture of an adjacent trim component.

In another aspect of the invention, an internal trim component for a vehicle comprises a trim member, and a decorative covering having an outer surface including a gradient characteristic comprising one of color and texture when referenced from one of an outer surface color and an outer surface texture of an adjacent trim component.

In yet another aspect of the invention, a method of manufacturing a decorative covering for an internal trim component for a vehicle comprising the step of forming a gradient characteristic on an outer surface of the decorative covering comprising one of color and texture when referenced from one of an outer surface color and an outer surface texture of an adjacent trim component.

In still yet another aspect of the invention, a method for manufacturing an internal trim component for a vehicle comprising the step of integrally molding a decorative covering with a trim member such that the decorative covering includes a gradient characteristic on an outer surface, the gradient characteristic comprising one of color and texture when referenced from one of an outer surface color and an outer surface texture of an adjacent trim component.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
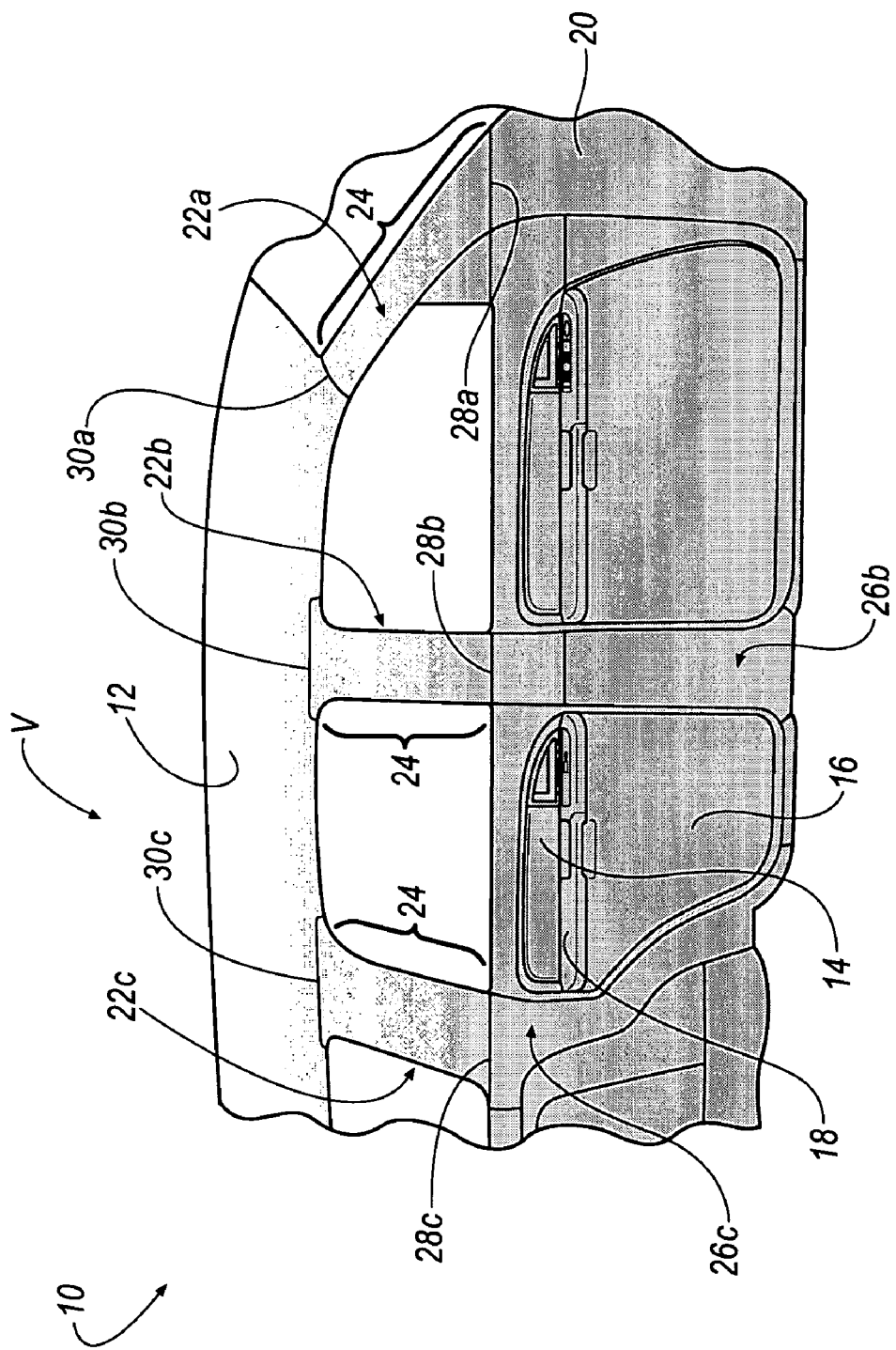
FIG. 1 illustrates an automotive passenger compartment including an interior trim component with a decorative covering having a gradient characteristic according to an embodiment of the invention.

Referring now to FIG. 1, a passenger compartment 10 of a vehicle, V, is shown and includes various interior trim components, such as a headliner 12, a door bolster 14, a door panel 16, a handle bezel 18, an instrument panel 20, and the like. The passenger compartment 10 also includes one or more pillars 22a–22c, commonly known as an "A-pillar", a "B-pillar", and a "C-pillar", respectively. The "A-pillar" 22a extends between the instrument panel 20 and the headliner 12, thereby forming a lower seam 28a at the junction between the pillar 22a and the instrument panel 30, and an upper seam 30a at the junction between the pillar 22a and the headliner 12. The "B-pillar" 22b is located between a lower portion 26b and the headliner 12, thereby forming an upper seam 28b and a lower seam 30b at the junction between the headliner 12 and the lower portion 26b, respectively. Similarly, the "C-pillar" 22c extends between a lower portion 26c and the headliner 12, thereby forming upper and lower seams 28c, 30c at the junctions between the headliner 12 and the lower portion 26c, respectively.

Figure 2:
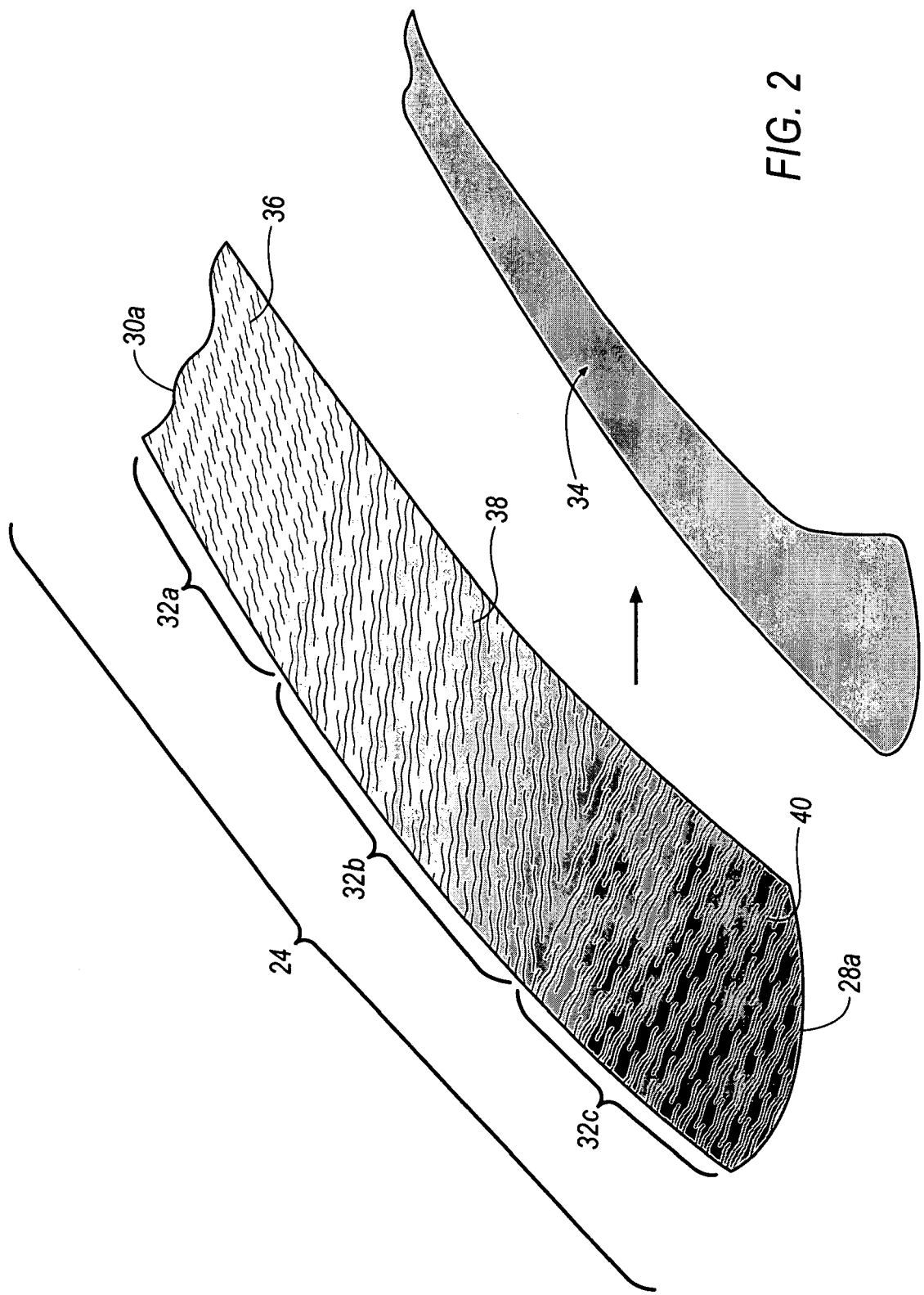
FIG. 2 is an exploded view of the decorative covering and a trim member for an interior trim component of FIG. 1.

One aspect of the invention is that one or more selected interior trim components are covered with a decorative covering 24 according to an embodiment of the invention. For example as illustrated in FIG. 2, the "A-pillar" 22a may be covered by a trim member 34, typically made of plastic material, and the like. In turn, the trim member 34 is covered by the decorative covering 24 of the invention having an outer surface visible to the occupants of the vehicle, V, which is commonly known as an "A-surface" for the interior trim component. As illustrated, the decorative covering 24 includes a gradient characteristic comprising a plurality of texture gradient zones and/or a plurality of color gradient zones, as indicated by gradient zones 32a–32c that correspond to three texture and/or color (indicated by grayscale shading) gradients 36, 38, 40.

In the illustrated embodiment, the texture of the decorative covering 24 in the first texture gradient zone 32a may be coarser in texture than the texture of the decorative covering 24 in the second and third texture gradient zones 32b, 32c. In addition, the color (as indicated by the grayscale shading) of the decorative covering 24 may be lighter in color in the first color gradient 36, then gradually blends into an intermediate color in the second color gradient 38, which is darker in color than the first color gradient 36, and then gradually blends into the third color gradient 40 that is darker in color than both the first and second color gradients 36, 38. It is preferred that the texture blending between the first, second and third gradient zones 32a–32c and the color blending between the first, second and third color gradients 36, 38, 40 is not noticeable to an occupant of the vehicle, V, but the overall appearance will provide a more aesthetically pleasing appearance to the passenger compartment 10, especially at the seams 28a–c, 30a–c, as compared to conventional decorative coverings. Similarly, the first, second and third texture gradients 36, 38, 40 can be provided such that the change in texture between gradients is not noticeable to the occupant.

It will be appreciated that the invention is not limited by the particular way in which the texture and/or color is arranged on the decorative covering 24. For example, the texture gradient zone 32a may be the coarsest as compared to the texture gradient zones 32b, 32c, while the color gradient 40 may be the lightest, or any combination thereof. It will also be appreciated that the invention is not limited by the number of texture and/or color gradient zones. For example, the invention can be practiced with only two texture gradient zones and/or color gradient zones, rather than three as in the illustrated embodiment. Further, the invention can be practiced with a different number of texture gradient zones than the color gradient zones. For example, the decorative covering 24 may have four texture gradient zones and only two color gradient zones. Even further, it will be appreciated that the invention is not limited to the type of interior trim component, and that the principles of the invention can be applied to any desirable trim component, such as the headliner 12, the door bolster 14, the door panel 16, the handle bezel 18, the instrument panel 20, and the like.

In another example, if the decorative covering for the headliner 12 comprises a fabric-based material and if the door bolsters 14, door panels 16, handle bezels 18, and instrument panel trim 20 are made of a generally smooth, plastic material, the texture gradient zone 32a of the pillar 22a–22c proximate the headliner 12 may include a textured surface resembling a fabric-based texture, and, conversely, the texture gradient zone 32c of the pillar 22a–22c near the door bolsters 14, door panels 16, handle bezels 18, and instrument panel trim 20 may include a textured surface resembling a generally smooth plastic surface. The texture gradient zone 32b that is intermediately located between texture gradient zones 32a, 32c may provide a neutral texture defined by a texture that is substantially similar to a combination of the fabric-based texture and the plastic texture.

It will be appreciated that the invention is not limited by the type of textured surfaces of one or more texture gradient zones 32a–32c. For example, the decorative covering 24 may have a texture gradient characteristic resembling a leather texture that provides a smooth transition of the texture and color of the headliner 12 as the pillar 22a–22c extends from the upper seam 30a–c to the lower seam 28a–c.

Although the decorative covering 24 includes a texture and/or color gradient intermediately located between and referenced from two interior trim portions, such as the headliner 12 and other interior trim components 14, 16, 18, 20, the decorative covering 24 may comprise a texture and/or color gradient including a transition/blending that spans two interior trim components near a seam. Accordingly, the decorative covering 24 and the lower portion 26 may include a color and/or texture gradient that spans the lower seam 28a–c and/or the upper seam 30a–c. For example, the decorative cover 24 may include a first texture and/or a lighter color, whereas the lower portion 26 may include a second texture and/or darker color that results in an intermediate texture and/or color that spans the lower seam 28a–c.

Figure 3A:
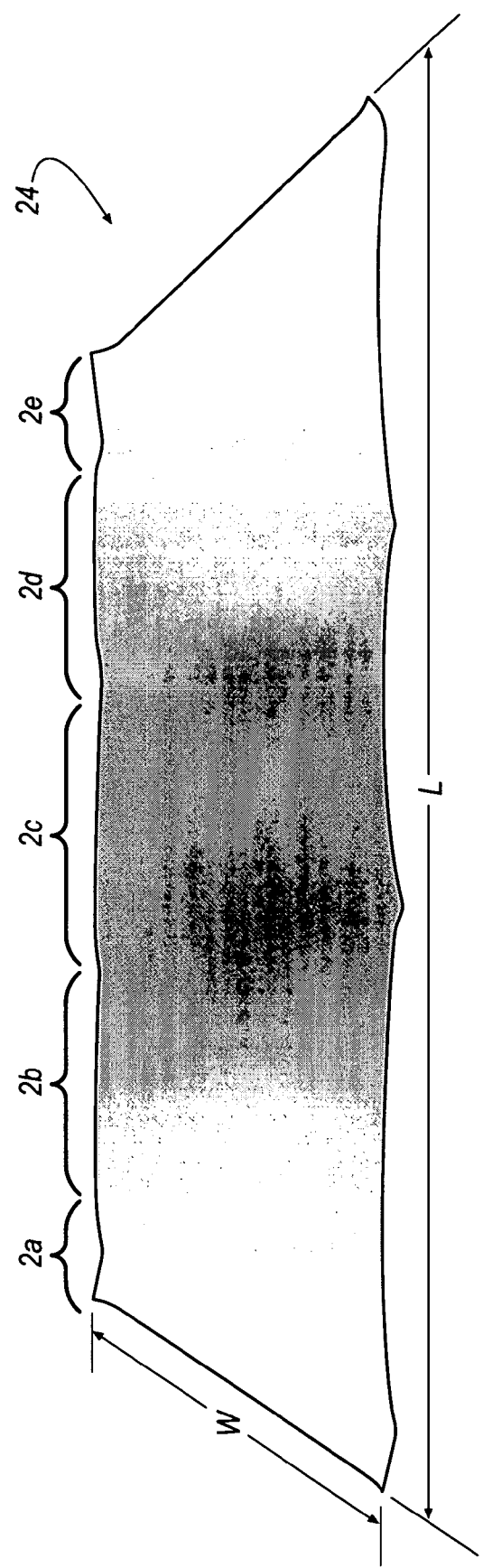
FIG. 3A illustrates a decorative covering for an interior trim component according to one embodiment of the invention.

Referring now to FIG. 3A, the decorative covering 24 may be defined by a length, L, and a width, W, prior to being applied to the trim member 34. According to an alternate embodiment of the invention, the gradient characteristic may comprise a plurality of color gradient zones, which are generally indicated as color gradient zones 2a–2e. As illustrated, color gradient zone 2c generally comprises a first color that gradually transitions to a second color in color gradient zones 2b, 2d, and then the color gradient zones 2b, 2d gradually transition to third color in color gradient zones 2a, 2e. As illustrated, color gradient zone 2c includes a relatively darker color and third color gradient zones 2a and 2e include a relatively lighter color. Further, the colors may be disposed on the decorative covering 24 in any desirable pattern. For example, the lightest color may be located in the color gradient zone 2c and the darkest color may be located in the color gradient zones 2a, 2e.

Figure 3B:
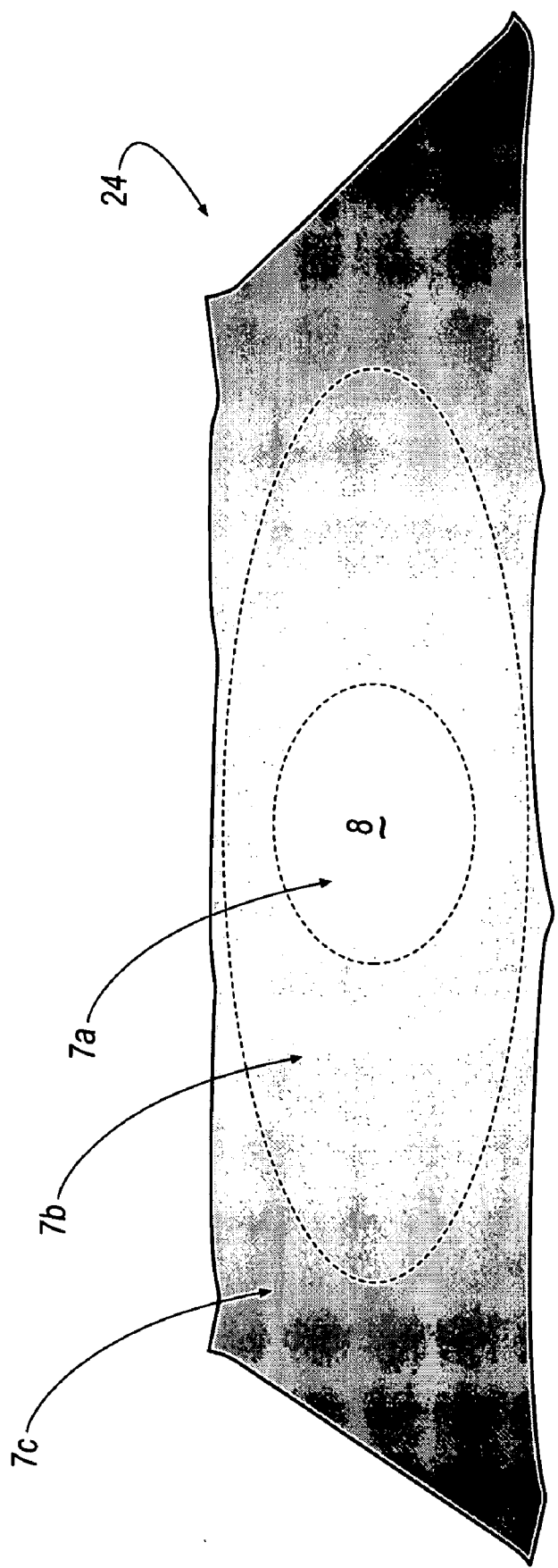
FIG. 3B illustrates a decorative covering for an interior trim component according to another embodiment of the invention.
Figure 4:
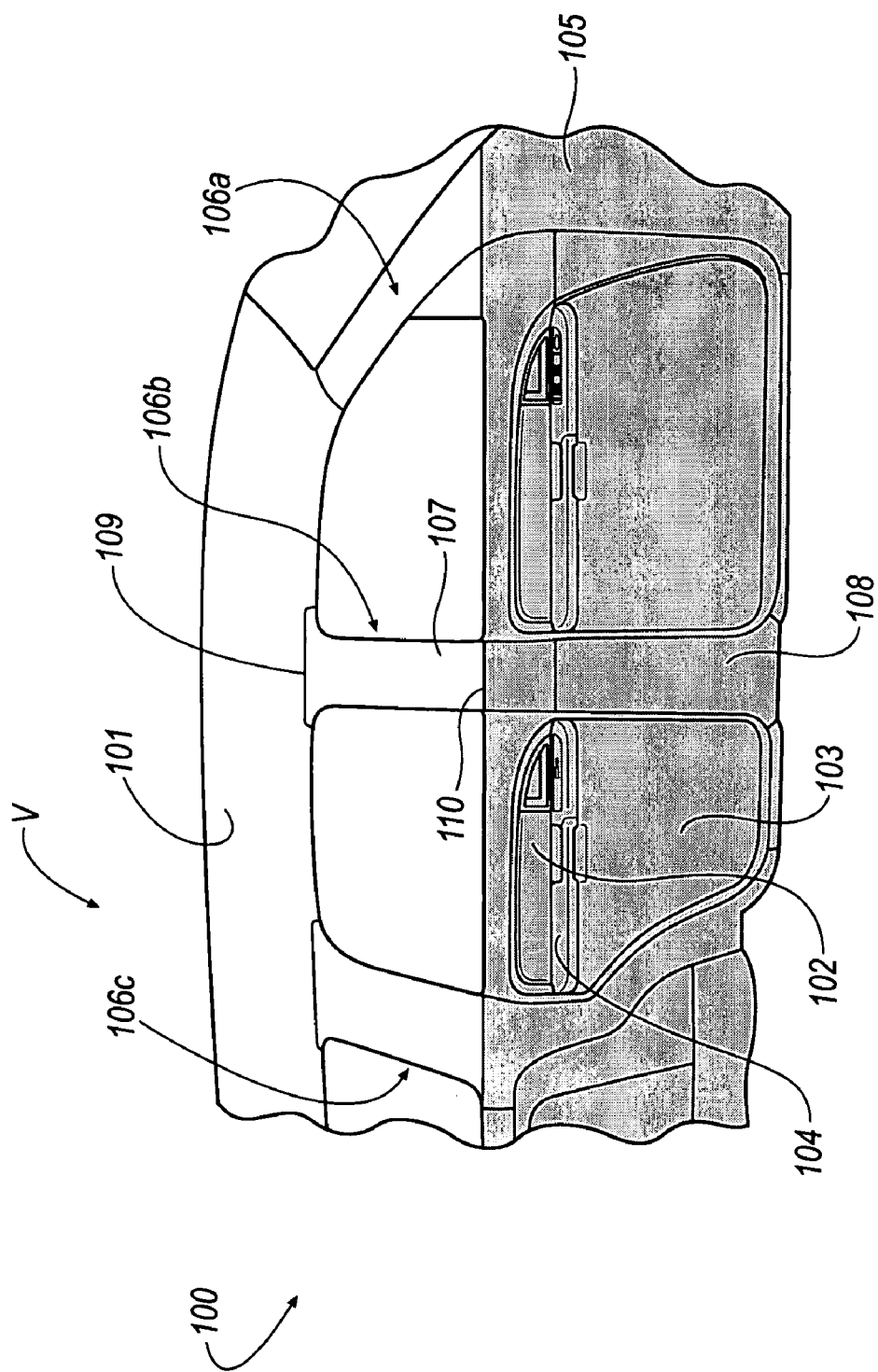
FIG. 4 illustrates a conventional automotive passenger compartment including conventional decorative coverings for interior trim components.

Although the illustrated decorative covering 24 includes a color pattern that transitions from light to dark and back to light, the frequency of the color changes of the decorative covering 24 may include any desired number of color changes. Even further, although the transition of color is shown along the width, W, the transition of color may occur in a diagonal pattern, a sinusoidal pattern, a tie-dyed pattern, or any other desirable pattern along the length, L, and the width, W, of the decorative covering 24. For example, one alternate embodiment of the decorative covering 24 is shown in FIG. 3B. The gradient characteristic may comprise gradient zones 7a–7c that ripple outwardly in a circular pattern from a central portion 8 of the decorative covering 24. It will be appreciated that the principles of the invention can be applied to a variety of other color/texture combinations and patterns too numerous to mention.

The decorative covering 24 may be applied to the trim member 34 by wrapping and gluing the decorative covering 24 to the trim member 34. Alternatively, the decorative covering 24 may be integrally formed with the trim member 34. For example, the material for the decorative covering 24 may be sprayed on a textured mold surface in a mold tool (not shown) and then the material for the trim member 34 may be extruded or injected over the decorative covering material. Alternatively, the decorative covering material may be integrally formed with the trim member material in an injection molding operation, such as a multi-shot molding operation, by first extruding or injecting the decorative covering material onto the textured mold surface of the mold tool, and then, the trim member material is subsequently extruded or injected over the decorative covering material in a second shot phase. Upon spraying and/or extruding the material for the decorative covering 24 and the trim member 34, tonnage or a vacuum is applied to the mold tool to form the texture gradient zones 32a–32c of the decorative covering 24 that was sprayed or extruded over the textured mold surface. The trim members 34 for the "B-pillar" 22b and the "C-pillar" 22c may be formed in a similar operation.

As discussed above, the texture gradient of the decorative covering 24 may be formed by using any suitable method, such as, by stamping, roll-pressing, molding, or the like. To realize the texture gradient, the decorative covering 24 may comprise any formable material, such as a thermoplastic material (e.g. vinyl), a thermoset material, an elastomeric material, and the like. Formable materials may include, but are not limited to, Acrylnitril-Butadien-Styrol-Copolymere (ABS), Polypropylene (PP), Polycarbonate-Acrylnitril-Butadien-Styrol-Copolymere (PC/ABS), Thermoplastic Olefin (TPO), polyvinyl chloride (PVC), styrene block co-polymer (SEBS), Thermoplastic Vulcanizate (TPV), thermoplastic polyurethane (TPU), and the like. If the texture gradient for the decorative covering 24 is formed in a mold tool (not shown), the material may be injected or sprayed onto a mold surface including the desired texture gradient. Although thermoplastic, thermoset, and elastomeric materials are discussed above, the formable material may comprise non-extruded or non-sprayed materials such as formable fabrics that may be stamped or vacuum-formed. Alternatively, stitched fabrics may be formed by varying the stitch pattern during the manufacturing of the decorative covering 24.

The color gradient for the decorative covering 24 may be realized by using any suitable printing process, which encompasses painting, dying, and the like. The printing process may be done manually, or alternatively by an automated process. According to one embodiment, the color gradient may be realized in a no-touch process by means of a multi-nozzle spray-gun (not shown). The desired fading pattern may be achieved by varying the feed rate of colors from each nozzle, the distance of each nozzle to the decorative covering 24, and the pressure of each nozzle. Other printing processes, such as pad-printing, which incorporates the use of a sponge, may be directly applied to the decorative covering 24 to achieve the desired color gradient. The color gradient may be applied to the decorative covering 24 after removing the formed trim member 34 from the mold tool.

As described above, the pillar trim 22a–22c is defined by a texture and/or color gradient that provides a blend or a smooth transition of the texture and/or color gradient at the seams 28a–c and at the seams 30a–c. As a result, the pillars 22a, 22b, 22c provide a more aesthetically pleasing appearance between the headliner 12 and the instrument panel 20, and between the headliner 12 and the lower portions 26b, 26c, as compared to conventional decorative coverings.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A system to associate a surface of an interior vehicular trim component with a surface adjacent vehicular components, said system comprising:
    an interior trim component having a surface covering defining an outer surface having a color and a texture; and
    a second vehicular component having an outer surface, wherein said outer surface of said second vehicular component is adjacent to said outer surface of said interior trim component,
    wherein said outer surface of said outer surface covering of said interior trim component includes one or both of (a) a color gradient characteristic that transitions the color between first and second different colors, wherein said second color is arranged on a portion of said outer surface that is most proximate to said outer surface of said second vehicular component and is generally the same as a color of a portion of said outer surface of said second vehicular component that is most proximate to said outer surface of said interior trim component, and (b) a texture gradient characteristic that transitions the texture between first and second different textures, wherein said second texture is arranged on a portion of said outer surface that is most proximate to said outer surface of second vehicular component and is generally the same as a texture of a portion of said outer surface of said second vehicular component that is most proximate to said outer surface of said interior trim component.

2. The system according to claim 1, wherein the gradient characteristic is a texture gradient characteristic that comprises a plurality of texture gradient zones.

3. The system according to claim 2, wherein the plurality of texture gradient zones transition from a first texture gradient zone having a first texture to a second texture gradient zone having a second, different texture.

4. The system according to claim 1, wherein the gradient characteristic is a color gradient characteristic that comprises a plurality of color gradients.

5. The system according to claim 4, wherein the plurality of color gradients transition from a first color gradient having a first color to a second color gradient having a second, different color.

6. The system according to claim 1, wherein the outer surface covering is integrally formed with the interior trim component.

7. The system according to claim 1, wherein the outer surface covering is adhered to an outer surface of the interior trim component.

8. The system according to claim 1, wherein the characteristic is a texture gradient characteristic and the transition between said first and second different textures is uniform.

9. The system according to claim 8, wherein the transition is linear.

10. The system according to claim 1, wherein the characteristic is a color gradient characteristic and the transition between said first and second different color is uniform.

11. The system according to claim 10, wherein the transition is linear.

* * * * *